United States Patent Office 3,426,080
Patented Feb. 4, 1969

3,426,080
PROCESS FOR THE PRODUCTION OF
PRIMARY MONOLS
Hans Tummes, Oberhausen-Sterkrade, and Josef Meis, Oberhausen-Osterfeld, Germany, assignors to Ruhrchemie Aktiengesellschaft, Oberhausen-Holten, Germany, a corporation of Germany
No Drawing. Filed Aug. 18, 1965, Ser. No. 480,819
Claims priority, application Germany, Aug. 26, 1964, R 38,665
U.S. Cl. 260—617  10 Claims
Int. Cl. C07c 35/02; C07b 5/00

ABSTRACT OF THE DISCLOSURE

Diols of the formula $HOCH_2-R-CH_2OH$, wherein R is a cycloaliphatic group of 6–12 carbon atoms are converted to the corresponding monols, by contacting the diol with at least partially reduced nickel catalyst at a temperature of 160–230° C., and in the presence of hydrogen.

---

It is known to convert primary alcohols into hydrocarbons having one carbon atom less than the starting alcohols with the aid of nickel catalysts under certain hydrogenation conditions according to the equation

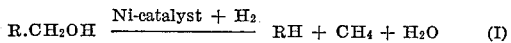

$$R.CH_2OH \xrightarrow{\text{Ni-catalyst} + H_2} RH + CH_4 + H_2O \quad (I)$$

The hydroxymethyl group of the primary alcohol is thereby split off with formation of methane and water. Cyclic as well as aliphatic primary alcohols were dehydroxymethylated with this process to hydrocarbons having one hydrocarbon less than the said alcohols (see Ipatieff et al., "Journ. Am. Chem. Soc.," 75, p. 6065, 76, p. 771, and 77, p. 5099). It is also possible to catalytically convert primary alcohols in absence of hydrogen into hydrocarbons having one carbon atom less than the starting alcohols.

It has now been found, that it is possible under definite conditions to split off only one hydroxymethyl group from bivalent alcohols, for example cyclic aliphatic alcohols, having two primary hydroxyl groups, so that it is possible to convert bivalent alcohols with good yields into primary alcohols having one carbon atom less than the starting bivalent alcohols. According to the invention, primary monovalent alcohols are prepared from bivalent alcohols with two primary hydroxyl groups having one carbon atom more than these primary monovalent alcohols respectively by contacting the said bivalent alcohols with at least partially reduced nickel catalysts at temperatures between 160 and 230° and preferably between 170 and 200° in presence of hydrogen. The reaction proceeds according to the equation

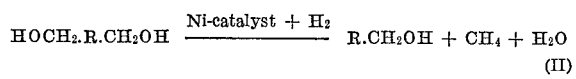

$$HOCH_2.R.CH_2OH \xrightarrow{\text{Ni-catalyst} + H_2} R.CH_2OH + CH_4 + H_2O \quad (II)$$

wherein R is preferably a cyclic system consisting of one or several rings and comprising 6 to 12 carbon atoms. According to the technically most interesting embodiment of the invention, the process is performed at an elevated pressure, preferably under a pressure between 20 and 100 kg./cm.²

This selectivity of the reaction was unexpected for bivalent alcohols since, in view of the hereinbefore mentioned studies of Ipatieff et al. on the degradation of primary alcohols, it was believed that the primary alcohol formed according to Equation II would be degraded to a hydrocarbon according to Equation I. With the process of the invention however, it is possible to reduce the formation of hydrocarbons having one carbon atom less than the monovalent primary alcohol to a minimum in favor of the yield of a primary alcohol having one carbon atom less than the starting bivalent alcohol.

The partial dehydroxymethylation of diols to monols with the aid of hydrogen according to the invention proceeds in presence of nickel catalyst under similar conditions as that prevailing at the known degradation of monols to hydrocarbons, however it must be performed within definite limits in order to obtain satisfactory yields. It is essential to maintain a definite reaction temperature. Since the splitting off of one hydroxymethyl group from a diol takes place at somewhat lower temperatures than that for the splitting off of the hydroxymethyl group from a monol, the reaction temperature of the process of the invention must be selected in a range wherein the diol, not however the monol is split off under simultaneous hydrogenation. Temperatures above 200°, especially above 230° yield higher amounts of hydrocarbons, while at lower temperature the conversion of diols remains incomplete. The catalysts suitable for the purposes of the invention are those known for the above-mentioned prior art process of converting monovalent, primary alcohols to hydrocarbons. Catalysts comprising nickel deposited on diatomaceous earth proved especially suitable; preferred are nickel catalyst of the following composition: 20 to 90% Ni, 1 to 20% MgO, 10 to 70% diatomaceous earth, all percentages dependent on the entire catalyst substance. Nickel catalysts on $Al_2O_3$ carriers are less suited. Sulfidic catalysts should not be used, since they don't cause the degradation of the $CH_2OH$ group but only the conversion of the hydroxyl group into hydrogen.

The reaction pressure is of certain influence on the course of the reaction, a pressure in the range of 30 to 100 kg./cm.² is especially suited. In order to assure a substantial selectivity of the degradation of the diols to monols, it is preferred to effect the conversion in such manner, that a considerable amount of the diol remains unconverted. According to an embodiment of the invention, the diol is only partially converted, preferably in an amount of 40 to 60%. Thus, only a small amount of hydrocarbons is formed. The non-converted diol is separated from the reaction mixture, for instance by distillation, and recycled into the reaction. Since the monol possesses one carbon atom less than the respective diol, it can be easily separated. The non-converted, isolated diol can be recycled to the reaction per se or in admixture with make-up diol.

The process of the invention can be performed in continuous or discontinuous operation. In the latter instance, it is advantageously effected in autoclaves, equipped with stirrers and charged with a suspended nickel catalyst. The continuous conversion is appropriately effected in reaction tubes provided with fixed nickel catalyst, whereby the diol to be converted can be conducted in the liquid state from below to above or in a sprinkling procedure from top to bottom of the reaction tube in order to be converted to the respective monol.

In certain instances, it is preferred to effect the reaction in presence of an inert reaction medium or diluent, especially when the starting diol is solid. These diluting agents should remain unchanged under the reaction conditions used. Higher ethers, preferably diisopropylether, are suited.

According to one embodiment of the invention, dihydroxymethylcyclododecane is converted to hydroxymethylcyclododecane. According to another embodiment, dihydroxymethyltricyclodecane is converted to hydroxymethyl-tricyclodecane.

The following examples are intended to illustrate the invention. The amounts herein mentioned are by weight, if not given in other terms.

EXAMPLE 1

A 2 l. autoclave equipped with a magnetic stirrer was charged with 500 g. dihydroxymethylcyclododecane, 500 g. diisopropylether and 50 g. of a reduced nickel-magnesia-diatomaceous earth catalyst, comprising 61% Ni, 7% MgO and 32% diatomaceous earth. The autoclave was closed, shortly flushed with hydrogen and pressurized up to 30 atmospheres. After starting the stirrer, the autoclave was heated up to 170° in the course of about 1 hour. By gradual addition of make-up hydrogen, the pressure in the autoclave was maintained at 100 atmospheres during the reaction time of 6 hours. Thereafter the autoclave was cooled, depressurized and the reaction mixture removed. After separation of the nickel catalyst and the diluent the reaction product had the following composition in percent by weight.

Cyclododecane _____ 5
Hydroxymethylcyclododecane _____ 50
Dihydroxymethylcyclododecane _____ 45

The residual gas contained 27% methane.

EXAMPLE 2

The autoclave of Example 1 was charged and pressurized as described in Example 1 with the difference that was heated for 3 hours at 185°. After separation of the diluent and the catalyst the reaction product had the following composition in percent by weight:

Cyclododecane _____ 43
Hydroxymethylcyclododecane _____ 44
Dihydroxymethylcyclododecane _____ 5
Higher condensation products _____ 8

EXAMPLE 3

The autoclave equipped with a magnetic stirrer of Example 1 was charged with 1 kg. of a mixture of equal parts isopropanol and dihydroxymethyl-tricyclodecane and 10% of the nickel catalyst and pressurized with hydrogen as described in Example 1. After a reaction time of 6 hours at 200°, the yield of hydroxymethyl-tricyclodecane amounted to 22%, while 1% tricyclodecane had been formed.

EXAMPLE 4

A vertical reaction tube with a length of 3 m. and an interior diameter of 30 mm. was provided with 1.8 l. fixed, reduced nickel-magnesia catalyst of Example 1. 0.4 l. of a mixture of equal parts by weight dihydroxymethylcyclododecane and diisopropylether were passed over this catalyst from bottom to top. Hydrogen was introduced over a pressure-regulator at the bottom of the tube, in order to maintain a constant pressure of 60 atmospheres. The reaction temperature ranged from 195 to 200°. From the reactor, the reaction product, together with the hydrogen, passed to a gas separator, from which 100 l. residual gas per hour were obtained by expansion. The methane-content of this residual gas amounted to 7 to 8%. The reaction mixture contained, after separation from the diluent (in percent by weight):

Cyclododecane _____ 6
Hydroxymethylcyclododecane _____ 61
Dihydroxymethylcyclododecane _____ 33

The dihydroxymethylcyclododecane was separated from the lower boiling components by distillation, mixed with an equal part by weight diisopropylether and returned to the reaction tube wherein it was passed from bottom to top over the nickel catalyst cocurrent with hydrogen under the hereinbefore described reaction conditions.

After separation from the diluent, the reaction mixture had the following composition in percent by weight:

Cyclododecane _____ 10.5
Hydroxymethylcyclododecane _____ 85.1
Dihydroxymethylcyclododecane _____ 4.4

EXAMPLE 5

A mixture of 200 g. ethanol and 200 g. dihydroxymethyltricyclodecane 5,2,1,0$^{2,6}$ was passed per hour through the reaction tube of Example 4. The reaction tube was maintained at a temperature of 195° whereby a constant $H_2$-pressure of 100 atmospheres was maintained by introduction of hydrogen over a pressure regulator. 200 l. residual gas per l. starting material were obtained, containing 4 to 6% methane. After separation from the diluent, the reaction product (inclusive 4% water) consisted of:

Percent by weight
Tricyclodecane _____ 1
Hydroxymethyltricyclodecane _____ 44
Dihydroxymethyltricyclodecane _____ 52
Higher condensation products _____ 3

Thus, the invention provides a process for replacing a hydroxymethyl group of a diol having 2 hydroxymethyl groups, with a hydrogen radical. The process comprises contacting the diol with an at least partially reduced nickel catalyst at a temperature of about 160-230° C. Thereby a hydroxymethyl group is replaced and the monol, corresponding to the diol and having 1 less hydroxymethyl group, is formed.

Temperatures given herein are in degrees Centigrade, unless otherwise indicated.

The process according to the invention is especially well suited for the conversion of dihydroxymethylcyclododecane and dihydroxymethyltricyclodecane 5,2,1,0$^{2,6}$. Dihydroxymethylcyclododecane $C_{12}H_{22}(CH_2OH)_2$ can be prepared by oxo-synthesis of cyclododecatriene followed by hydrogenation according to German Patent 1,059,904, whereby probably a mixture of several isomers is obtained. The latter are converted to a uniform monol of the formula $C_{12}H_{23}CH_2OH$.

Dihydroxymethyltricyclodecane can be obtained according to U.S. Patent 2,850,536 by oxo-synthesis of dicyclopentadiene followed by hydrogenation of the aldehyde thereby obtained. It has the formula

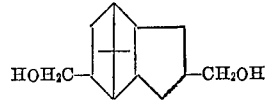

and is preferentially converted to a monol of the formula

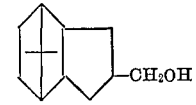

with the process of the invention.

The auxiliary compound present during the reaction of the invention serves not only as solvent for the diol to be converted but also as diluent, which assures the selective splitting off of only one hydroxymethyl group.

The product alcohols, especially those obtained with the processes described in the examples are valuable intermediate products especially for the preparation of esters, lactames and other compounds used in the field of the manufacture of artificial resins.

What is claimed is:

1. A process for replacing a hydroxmethyl group of dihydroxymethylcyclododecane or dihydroxymethyltricyclodecane, with a hydrogen radical, which comprises contacting the diol with an at least partially reduced nickel catalyst at a temperature of about 160-230° C. in the presence of hydrogen, thereby replacing a hydroxmethyl group and forming from the diol the corresponding monol having one less hydroxymethyl group.

2. Process according to claim 1, wherein the temperature is about 170-200° C.

3. Process according to claim 1, wherein the hydrogen pressure is about 20-100 kg./cm.$^2$.

4. Process according to claim 1, wherein about 40-60% of said diol reacts during said contacting.

5. Process according to claim 1, wherein said catalyst consists essentially of about 20-90% nickel, about 1-20% MgO, and about 10-70% diatomaceous earth.

6. Process according to claim 1, wherein the diol is present in an inert reaction medium.

7. Process according to claim 1, wherein said diol is dihydroxymethylcyclododecane and said monol is hydroxymethylcyclododecane.

8. Process according to claim 1, wherein said diol is dihydroxymethyltricyclodecane and said monol is hydroxymethyltricyclodecane.

9. Process according to claim 7, wherein the diol is present in diisopropylether.

10. Process according to claim 8, wherein the diol is present in diisopropylether.

References Cited

I. T. Clark: Hydrogenolysis of Sorbitol, Ind. Eng. Chem., 50, pp. 1125–1126 (1958).

LEON ZITVER, *Primary Examiner.*

M. W. GLYNN, *Assistant Examiner.*

UNITED STATES PATENT OFFICE
CERTIFICATE OF CORRECTION

Patent No. 3,426,080                                                    February 4, 1969

Hans Tummes et al.

It is certified that error appears in the above identified patent and that said Letters Patent are hereby corrected as shown below:

Column 3, lines 21 and 22, "that was" should read -- that it was --.
Column 4, lines 59 and 64 and 65, "hydroxmethyl", each occurrence, should read -- hydroxymethyl --.

Signed and sealed this 24th day of March 1970.

(SEAL)
Attest:

Edward M. Fletcher, Jr.                                  WILLIAM E. SCHUYLER, JR.
Attesting Officer                                                Commissioner of Patents